US008565836B2

United States Patent
Othmer et al.

(10) Patent No.: US 8,565,836 B2
(45) Date of Patent: *Oct. 22, 2013

(54) SELECTIVE ACTIVATION OF ALERTS FOR RECEIPT AND AVAILABILITY OF DATA IN A COMMUNICATION DEVICE

(75) Inventors: Konstantin Othmer, Mountain View, CA (US); Michael P. Ruf, Parkland, FL (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,374

(22) Filed: Jul. 6, 2012

(65) Prior Publication Data

US 2012/0276878 A1 Nov. 1, 2012

Related U.S. Application Data

(63) Continuation of application No. 12/021,946, filed on Jan. 29, 2008, now Pat. No. 8,233,943.

(51) Int. Cl.
| | |
|---|---|
| H04M 1/725 | (2006.01) |
| H04M 3/42 | (2006.01) |
| H04M 1/00 | (2006.01) |
| H04M 3/00 | (2006.01) |
| H04B 1/38 | (2006.01) |
| G06F 3/00 | (2006.01) |
| G06F 9/44 | (2006.01) |
| G06F 9/46 | (2006.01) |
| G06F 13/00 | (2006.01) |

(52) U.S. Cl.
USPC ............. 455/567; 455/412.2; 379/207.16; 379/373.01; 719/318

(58) Field of Classification Search
USPC .......... 455/412.2, 418, 466, 567; 379/207.16, 379/373.01; 719/318
See application file for complete search history.

(56) References Cited

U.S. PATENT DOCUMENTS

| 2002/0163572 A1 | 11/2002 | Center et al. |
| 2005/0058268 A1 | 3/2005 | Koch |

(Continued)

FOREIGN PATENT DOCUMENTS

| EP | 1617359 A1 * | 1/2006 |
| JP | 2004234336 A | 8/2004 |
| WO | 2005009009 A2 | 1/2005 |

OTHER PUBLICATIONS

U.S. Appl. No. 12/021,946, Oct. 26, 2010, Office Action.

(Continued)

Primary Examiner — Opiribo Georgewill
(74) Attorney, Agent, or Firm — Workman Nydegger

(57) ABSTRACT

A recipient activates or deactivates user alerts associated with the receipt and/or availability of communications using rules in an alert profile stored on a device, a server, or a location accessible to the server. In one embodiment, the device can implement the rules when a communication is received and/or available. If an alert is activated, the device renders the alert. If the alert is deactivated, the device does not render the alert unless and until the alert is activated. In another embodiment, the server can implement the rules. If the alert is activated when the communication is transmitted to the device, the server also transmits alert-rendering instructions, whereupon the device can render the alert as specified in the instructions. If the alert is deactivated when the communication is transmitted to the device, the server does not transmit the instructions unless and until the alert is activated.

20 Claims, 4 Drawing Sheets

(56) References Cited

U.S. PATENT DOCUMENTS

| | | |
|---|---|---|
| 2005/0186977 A1 | 8/2005 | Chiu et al. |
| 2005/0243987 A1 | 11/2005 | Polouchkine et al. |
| 2006/0025164 A1 | 2/2006 | Wang et al. |
| 2007/0237321 A1 | 10/2007 | Bloebaum et al. |

OTHER PUBLICATIONS

U.S. Appl. No. 12/021,946, Mar. 31, 2011, Final Office Action.
U.S. Appl. No. 12/021,946, Sep. 12, 2011, Office Action.
U.S. Appl. No. 12/021,946, Feb. 2, 2012, Final Office Action.
U.S. Appl. No. 12/021,946, Apr. 2, 2012, Notice of Allowance.

* cited by examiner

SELECTIVE ACTIVATION OF ALERTS FOR RECEIPT AND AVAILABILITY OF DATA IN A COMMUNICATION DEVICE

CROSS-REFERENCE TO RELATED APPLICATIONS

This application is continuation of U.S. patent application Ser. No. 12/021,946 filed on Jan. 29, 2008 and entitled "SELECTIVE ACTIVATION OF ALERTS FOR RECEIPT AND AVAILABILITY OF DATA IN A COMMUNICATION DEVICE," which application is hereby expressly incorporated herein in its entirety.

BACKGROUND OF THE INVENTION

1. The Field of the Invention

The present invention relates generally to notifying users about electronic communications received by communication devices. More particularly, embodiments of the invention relate to systems and methods for selectively activating and deactivating user alerts for the receipt and availability of electronic communications.

2. The Relevant Technology

Since their inception, cellular service providers and device manufacturers have been offering an ever-increasing array of messaging and communication capabilities to mobile device users. A basic cellular or mobile telephone can typically engage in conventional telephone calls at a minimum. Optional communication capabilities include the ability to send and receive SMS (Short Message Service), EMS (Enhanced Messaging Service), MMS (Multimedia Message Service) and voice messages (also referred to as instant voice messages, VoiceSMS messages and Vnotes® messages), email, and other types of communications, including digital media files such as podcasts, music and other audio, videos, and the like. Sometimes, these types of communications are used when a sender does not have an urgent need to communicate with a recipient, or when a recipient does not have an urgent need to receive a communication (e.g., when the recipient subscribes to a regular podcast delivery service).

In many instances, particularly when the user relies on the mobile device for all of his or her telephony needs, the user may leave the mobile device turned on at night or whenever the user sleeps to ensure that any urgent telephone calls can be received. During these times, the user may wish to deactivate alerts (including alerts indicative that a communication has been received and alerts, such as message waiting indicators, indicative that a communication is available) associated with the receipt and availability of typically non-urgent communications, such as those mentioned above. However, alert deactivation has conventionally been an all-or-nothing action. In other words, the user can turn off the device or turn it to silent mode, but this affects all incoming communication, including potentially urgent incoming calls. Conventional mobile devices lack the capability to selectively activate or deactivate user alerts for different types of incoming communications, or based on the identity of the sender of the communication or the type of content contained in the communication.

Other mobile devices permit users to activate and deactivate alerts for different types of incoming communications through the creation of different profiles. However, in this situation, users must manually change profiles every time a change is desired. The user may create a regular profile by which the mobile device alerts the user about all incoming communications and a sleep profile by which the mobile device alerts the user regarding incoming telephone calls, but not other incoming messages. If the user forgets to change from the regular profile to the sleep profile prior to going to sleep, the user may be awakened by the receipt of a non-urgent message.

Accordingly, there currently exists a need in the art for improving user alerts associated with the receipt of communications by a communication device.

BRIEF SUMMARY OF THE INVENTION

These and other limitations are overcome by embodiments of the invention, which relate to methods and systems for alerting recipients about the receipt of communications. More particularly, embodiments of the invention enable recipients to selectively activate alerts for various types of communications based on one or more criteria such as the proximity of the recipient device to the sender's device and/or to a particular location, the time the communication is received, the priority of the communication, the sender of the communication, and the content of the communication. According to one aspect of the invention, the recipient establishes or creates rules for initiating alerts in response to the receipt or availability of a communication. The alerts are activated or deactivated as provided by the rules. If a communication is received when an alert is activated, the recipient's device initiates an alert regarding the receipt or availability of the communication. If the communication is received when the alert is deactivated, the recipient's device does not initiate an alert unless and until the alert is later activated.

Embodiments of the invention for selectively activating alerts for received and/or available communications can be used in conjunction with wireless devices, as well as landline devices. A recipient device, a website or a computer can be used to specify rules that determine whether an alert will be initiated to notify the recipient of the receipt and/or availability of a communication. If an alert is activated at the time the communication is received, the alert will be initiated. Conversely, if an alert is deactivated at the time the communication is received, the alert will not be initiated.

The rules specified by the recipient are saved in an alert profile. The communication may comprise an incoming voice call, a digital media file or an MMS, SMS, EMS, voice message (such as a Vnotes voice message), email message or other data or content. The rules may activate and deactivate alerts based on the recipient device's physical proximity to some other device/location, the identity of the sender of the communication, the type of the communication received, the time of day when the communication is received, the priority of the communication, or the content of the communication.

A server receives a communication intended for the recipient device and transmits the communication to the recipient device. The server may function as a message server for various types of communications (e.g., emails, SMS messages, MMS messages, etc.). Either the server or the recipient device can implement the rules stored in the alert profile to determine whether to alert the recipient about the received communication. If, according to the rules, an alert is deactivated, the recipient device does not alert the recipient about the communication unless and until the alert is activated.

In one aspect of the invention, the recipient specifies that alerts for certain types of communications, such as for asynchronous communications, are deactivated during a certain timeframe every day, such as during the night hours. Thus, if the recipient device receives an asynchronous communication during the deactivated period of time (e.g., at night), the recipient device does not alert the recipient about the receipt of the communication until the period of time is over (e.g., in the morning). However, if the recipient device receives a conventional telephone call during the deactivated period of time, the recipient device alerts the recipient, since a conventional telephone call is not an asynchronous communication.

When the server implements the rules, the server may deliver both the communication and alert-rendering instructions to the recipient device. The alert-rendering instructions may specify whether, when, and/or how an alert is rendered. In one embodiment, the alert-rendering instructions are delivered substantially simultaneously with the communication if an alert is activated. In this embodiment, if the alert is deactivated, the alert-rendering instructions are delivered later upon alert activation. In another embodiment, the alert-rendering instructions are delivered substantially simultaneously with the communication whether the alert is activated or not, and the recipient device determines when to render the alert as specified in the instructions. Alternatively, the server may not transmit either the communication or the alert-rendering instructions until the alert is activated.

Using embodiments of the invention, the recipient may selectively activate or deactivate alerts for broad categories of communications, such as for all asynchronous communications, or the recipient may activate or deactivate alerts for certain communication types, such as for all SMS messages. Further, when the recipient is activating or deactivating alerts for a chosen set of communications, the recipient may specify in the alert profile how the alerts should be rendered, for example as an audible alert, visible alert, tactile alert, or any combination thereof.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
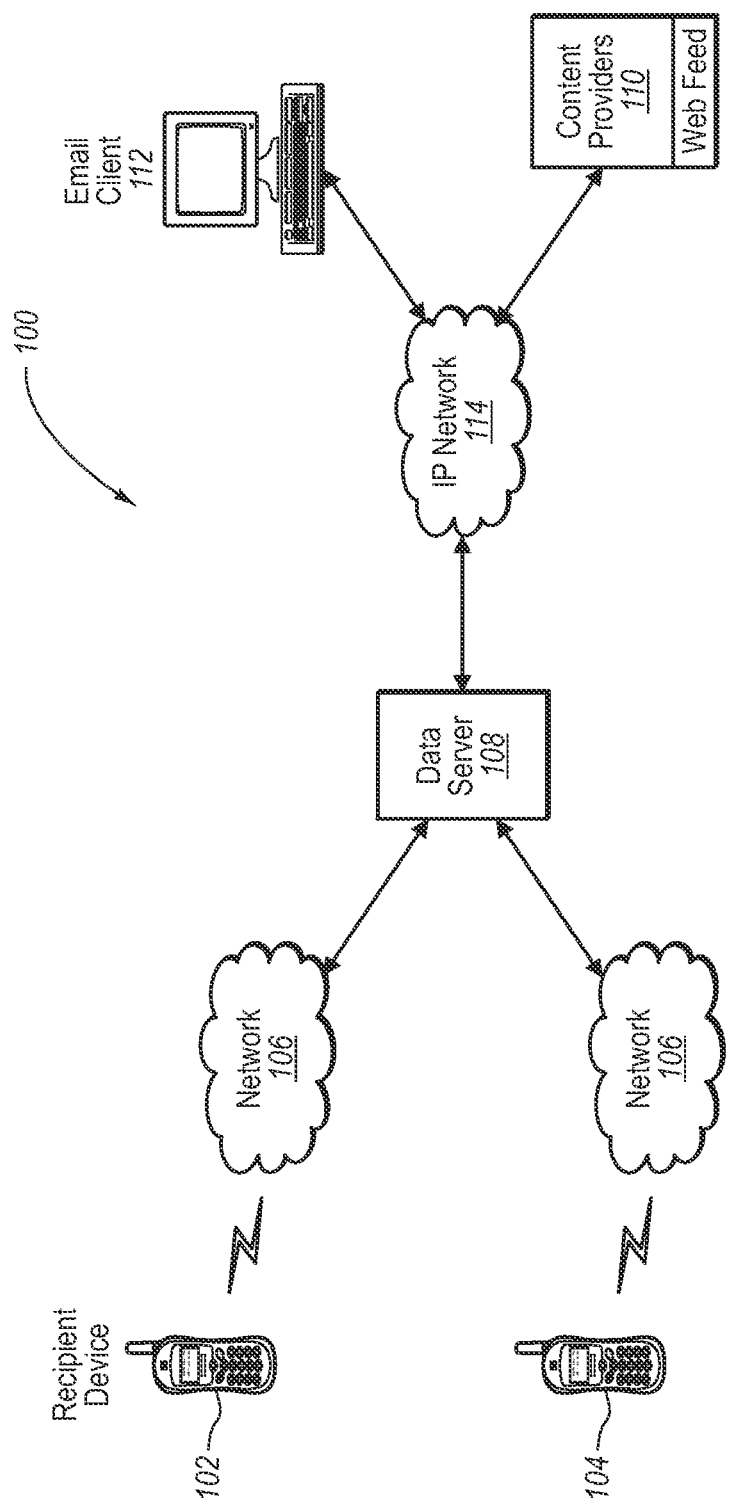
FIG. 1 illustrates one embodiment of a communications network in which the invention may be practiced.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

The present invention relates to data delivery and notification in communication devices. More particularly, embodiments of the invention relate to selective activation of alerts indicative of the receipt and/or availability of communications in a communication device based on one or more criteria. An alert can be generated in response to the receipt of a communication at either a server or a recipient device, generated in response to the availability of a communication at either a server or a recipient device, generated in response to alert-rendering instructions that are separate from, integral to, and/or sent separately from a communication, and the like or any combination thereof. Alert-rendering instructions include information about the recipient's pre-defined alert preferences, which may specify how the recipient device should render an alert associated with a particular communication or type of communication. Alerts can be visual, audible, tactile (e.g., vibration), and the like or any combination thereof.

Embodiments of the invention enable a recipient to specify rules for selectively activating alerts associated with the receipt by and/or availability to a recipient device of communications including incoming voice calls, digital media files, and SMS, EMS, MMS, email messages, voice messages such as Vnotes® instant voice messages, and other data. A communication to a device may also include content such as video data, voice data, text, image data, other types of data and the like or any combination thereof.

A recipient establishes an alert profile for a recipient device. The recipient may use the alert profile to create rules and preferences for the rendition of alerts for various communications. For example, the recipient may desire to establish do-not-disturb hours during the night such that during the do-not-disturb hours, alerts for incoming messages or podcasts are not rendered by the recipient device but alerts for incoming telephone calls are. According to one embodiment of the invention, the recipient's alert profile is stored on the communication device, while in another embodiment of the invention the recipient's alert profile is stored in a remote location such as on a server.

A server or other network component (e.g., a mobile telephone switching office "MTSO") receives a communication such as a voice call, message, podcast, or other data intended for the recipient device and transmits the communication to the recipient device. The recipient device receives the communication and refers to the recipient's alert profile to determine whether to alert the recipient about the arrival of the communication, which may depend on one or more criteria such as the current time at the recipient device, who the communication is from, the type of the communication, physical proximity to a location or to the originating device, content of the communication, priority of the communication, and the like or any combination thereof. Additionally, the recipient device can refer to the alert profile to determine what type of alert to render for activated alerts. If, according to the rules, an alert is deactivated at the time the communication is received, the alert is not rendered until the alert is activated at a later time. If the alert is activated when the communication is received, the alert may be rendered as soon as the communication is received using one or more alert types specified in the alert profile.

In another embodiment of the invention, the server delivers the communication and additionally delivers alert-rendering instructions separate from or integral to the communication.

The alert-rendering instructions can be formulated by the server from the alert profile and can specify either how to render an alert (e.g., what type of alert to render), or both how to render an alert and when to render it (e.g., under what circumstances). In any event, the server receives the communication from an originating device/location and refers to the recipient's alert profile prior to or soon after transmitting the communication to the recipient device.

In one embodiment, if an alert is deactivated according to the rules, the server may transmit the communication to the recipient device without transmitting the alert-rendering instructions to the recipient device until the alert is activated. If the alert is activated, the server transmits the communication and the alert-rendering instructions to the recipient device. Alternately, the server can transmit the alert-rendering instructions with the communication whether the alert is activated or deactivated and allow the recipient device to determine when to render the alert. In any case, a data client on the recipient device renders alerts as specified in the alert-rendering instructions.

The types of user alerts commonly used to notify a recipient about the arrival of a communication include audible alerts such as a ring, beep, tune or other sound; visual alerts such as a lighted or flashing display or an icon depicting the type of new data received; tactile alerts such as vibrations; and any combination thereof. In some embodiments of the invention, the recipient may deactivate alerts indicative that a communication has been received while activating alerts indicative that the communication is available. For instance, some recipient devices are configured to notify a recipient that a message has been received upon receipt of the message, and then provide subsequent notifications (e.g., message waiting indicators) that the message is available. Advantageously, alerts indicative of communication availability can be configured independently of alerts indicative of communication arrival.

FIG. 1 illustrates an exemplary implementation of an operating environment, denoted generally at 100. The wireless communication system 100 includes a plurality of communication devices 102, 104 configured to send and receive data over a network 106. When the communication devices 102, 104 are mobile communication devices, the network 106 includes a cellular RF network. However, the network 106 may also include or represent other types of wired/wireless networks such as, but not limited to, 802.xx networks, Bluetooth access points, wireless access points, IP-based networks, a Public Switched Telephone Network and broadcast networks such as FM radio or satellite radio. The network 106 also includes the servers that enable one type of network to interface with another type of network. The communication devices that may be employed in conjunction with the invention include PCs, landline telephones, cellular telephones, PDAs, laptop computers and any other device capable of sending and receiving data and suitably equipped to establish communication with a network.

The devices 102, 104 may engage in synchronous communications using network components (such as an MTSO) as intermediaries. Synchronous communications include conventional voice calls which can be implemented according to methods known in the art.

Alternately or additionally, the devices 102, 104 may engage in asynchronous communications using a data server 108 as an intermediary. As used herein, "asynchronous communication" refers to a sender transmitting data to a server or queue without waiting for a response from a recipient, and the server or queue transmitting the data to the recipient sometime thereafter. For example, a sender device 104 may compose and send an MMS message to a recipient device 102. The MMS message is not sent directly from the sender 104 to the recipient 102; rather, the MMS message is sent to an MMS Center (MMSC) where it is stored until forwarded to the recipient. This technique for delivering a message is also known as "store and forward" message delivery, which is exemplary of asynchronous communication. Asynchronous communications include the transmission of digital media files using a digital media server as described herein, as well as MMS, SMS, EMS, voice messages and email messages.

Typically, the server 108 comprises a general purpose computer, with suitable interface hardware for receiving, transmitting and storing communications. In the embodiment of FIG. 1, the server 108 is configured to communicate with the devices 102, 104 over the network 106, as well as with one or more content providers 110 and email clients 112 over an IP network 114. The server 108 retrieves digital media files published by the content providers 110, which files are supplied in the form of web feeds—e.g., in Really Simple Syndication (RSS) or Atom formats. In a typical embodiment a digital media file may be a podcast, which is a web-based broadcast of an audio and/or video content file. Content providers include weblogs, podcasters, vlogs, and mainstream mass media websites. The server 108 may also receive emails from the email client 112 addressed to the recipient device 102.

In the embodiment of FIG. 1, the server 108 is configured to store and forward MMS messages, SMS messages, EMS messages, voice messages, email messages, digital media content and other data. In other words, the server may function as an MMSC, an SMS Center (SMSC), an EMS Center (EMSC) a voice message server, an email server and a digital media server. Those of skill in the art will recognize that FIG. 1 is only illustrative. The various servers may be integrated into one unit as shown, they may each exist as an independent server, or in any combination thereof. Further, the data server 108 may incorporate fewer or more servers than those discussed and illustrated herein. The server 108 may alternately or additionally include multiple servers that may be operated by different entities.

The data server 108 may be configured to store and forward communications according to methods known in the art. For instance, when storing and forwarding an SMS message, the server may simply transmit the SMS message to a communication device 102 over a control channel of the network 106. When storing and forwarding an MMS message, the server may first transmit a message-waiting notification to a communication device 102 using an SMS notification, HTTP push or WAP push, after which the device retrieves the message from the server. Email messages, voice messages, digital media content and other communications may similarly be stored and forwarded to a recipient device by methods known in the art.

Figure 2:
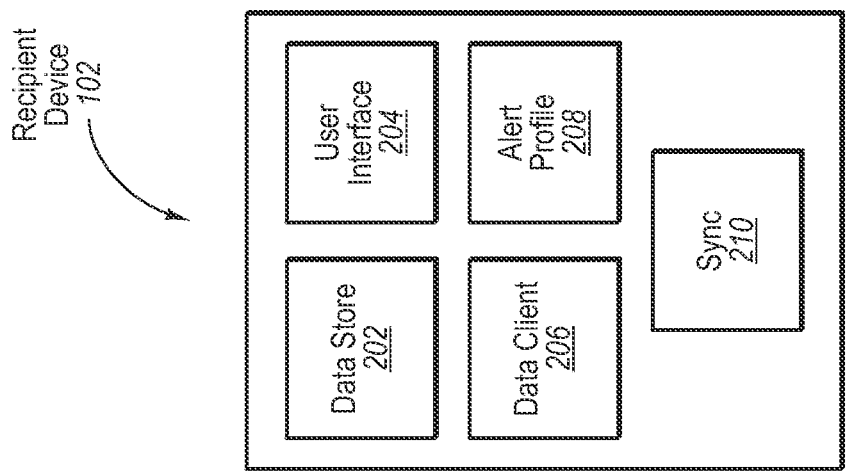
FIG. 2 illustrates one embodiment of a device for selectively activating user alerts associated with the receipt of a communication.

FIG. 2 illustrates an exemplary implementation of a recipient device 102, which is suitably equipped to establish a connection with one or more networks and with a server, and send and receive data. The recipient device 102 may include data store 202, a user interface 204, a data client 206, an alert profile 208 and a syncing module 210.

A recipient accesses and modifies the alert profile 208 through the user interface 204 on the communication device. In another embodiment of the invention, the recipient modifies the alert profile 208 remotely on a laptop, PC or other computing device and later synchronizes the modification to the device through the sync module 210, as can be done with PDAs, smartphones and other devices. In yet another embodiment, the user modifies the alert profile at a website and the server 108 later syncs the modification to the device through the sync module 210 over the network 106.

The recipient may define rules in the alert profile 208 for the activation and deactivation of alerts associated with the receipt and availability of communications from the server 108 (or from an MTSO or other network component). In one embodiment, the recipient can define rules that activate or deactivate alerts based on communication type. As an example, the rules may activate alerts for the receipt of all MMS messages while deactivating alerts for the receipt of all SMS messages. Or, the rules may activate alerts for telephone calls while deactivating alerts for all asynchronous communications.

Alternately or additionally, the recipient can define rules that activate and deactivate alerts based on other criteria such as time of day, physical proximity to another device or location, or who the communication is from. For instance, the recipient may wish to deactivate alerts during the nighttime, to deactivate alerts for communications from a particular sender, or to activate alerts for communications from a particular sender when within a certain radius of the sender's physical location. Some rules can depend on two or more criteria. For instance, the recipient may wish to deactivate alerts during the nighttime except for alerts for incoming voice calls from a particular sender.

Furthermore, the recipient can specify an alert type (e.g., how to render the alert) for each activated alert. Alert types include audible alerts, visible alerts, tactile alerts, and the like or any combination thereof. For example, the user may activate a first alert for all email messages and specify that the first alert be visual while activating a second alert for all voice messages and specifying that the second alert be audible.

Finer granularity in configuring alerts can also be provided. For instance, the recipient can configure an alert based on the content of a communication. As used herein, "configuring an alert" refers to activating or deactivating an alert and specifying an alert type based on one or more criteria.

As an example, alerts for email messages can be configured to activate or deactivate depending on the content of the email messages. Many communication devices in use today support the receipt and management of email messages from one or more email accounts, which can overwhelm a recipient with a significant number of email messages. While voice messages can be received at a communication device via standard voicemail systems, voice messages can also be received as email attachments or be provided via links embedded in emails. Nevertheless, because the activation or deactivation of alerts for a particular message is an all or nothing proposition in a conventional system, a recipient receives (or does not receive) an alert every time a regular email message or an email message containing a voice message is received, even if the recipient only wants to receive alerts for the latter. Accordingly, embodiments of the present invention permit a recipient to configure alerts for communications based on the content of the communication and the recipient in this case could activate an alert for all email messages containing voice message attachments or embedded links and deactivate alerts for all other email messages.

According to one embodiment of the invention, a sending device 104 or an email client 112 is configured to permit a sender of a communication to specify a priority for the communication, which may be yet another criteria used in configuring alerts. For instance, the sender of a communication may assign a priority to the communication such as urgent, regular, or low priority. In this case, the rules established by the recipient in the alert profile may take into account communication priority classifications. For instance, the recipient may desire to deactivate voice message alerts during the nighttime unless the voice message is classified as urgent by the sender.

Accordingly, the data server 108 receives an asynchronous communication addressed to a recipient device 102 and transmits the communication to the device where it is stored in the data store 202. In one embodiment, the recipient device communicates with the data server and is able to receive the communication using the data client 206. The data client 206 may be a module or program configured to process and render communications received from the data server 108. The communication transmitted to the recipient device 102 may be an MMS voice message, in which case the data client 206 has a corresponding MMS client. Alternatively, the communication transmitted to the recipient device 102 may be an email message, an SMS message, an EMS message, a voice message and the data client 206 may be a corresponding client capable of handling the communication.

When the data client 206 receives a communication, the data client determines whether to alert the recipient about the arrival of the new communication by referring to the alert profile 208. If the data client 206 determines that an alert is deactivated as provided by the rules, the data client does not render the alert. In contrast, if the data client determines that the alert is activated, the data client renders the alert as specified by the rules (e.g., audibly, etc.).

For instance, according to one embodiment of the invention, a rule deactivates alerts for all asynchronous communications received from the server 108 during a specific timeframe every night. The user may wish to receive user alerts for incoming telephone calls during the night but not receive user alerts for incoming digital media files or MMS, SMS, EMS, voice messages such as Vnotes instant voice messages, or email messages during the night. In this case, when an asynchronous communication is received by the device, the data client refers to the alert profile to determine if the communication is being received during the specific timeframe and if the communication is subject to alert deactivation. If it is received during the specific timeframe and is an incoming digital media file or MMS, SMS, EMS, voice message or email message, the data client does not render a user alert. If it is not received during the specific timeframe and/or it is a telephone call, the data client renders a user alert.

Advantageously, if the recipient is asleep at night during the specific timeframe, the user will not be awakened by a casual email, MMS, SMS, EMS or voice message from a friend or acquaintance, or by the arrival of a podcast or other digital media file since the user alerts for those types of communications are deactivated. At the same time, a recipient device will still render an alert for a telephone call since the rules in the alert profile in this case do not deactivate alerts for telephone calls. Furthermore, when the data client 206 receives a communication and does not render an alert because the alert is deactivated, the data client may be configured to periodically refer back to the alert profile and to render the alert when the alert is no longer deactivated.

The data client 206 may be programmed in software or firmware to implement the rules in the alert profile. For instance, the recipient may specify in the alert profile that alerts for asynchronous communications should not be rendered between the hours of 10:00 p.m. and 6:00 a.m. ("do-not-disturb hours"). Upon receiving a communication, the data client compares the actual time (which may be done by reference to an internal clock, etc.) to the do-not-disturb hours and if the actual time falls within the do-not-disturb hours, the data client does not render an alert. As another example, the recipient may specify in the alert profile that alerts for asynchronous communications received from a particular sender are not to be rendered unless the recipient is within a two-mile radius of the sender. In this case, the data client compares the recipient's location to the sender's location to make the determination.

Figure 3:
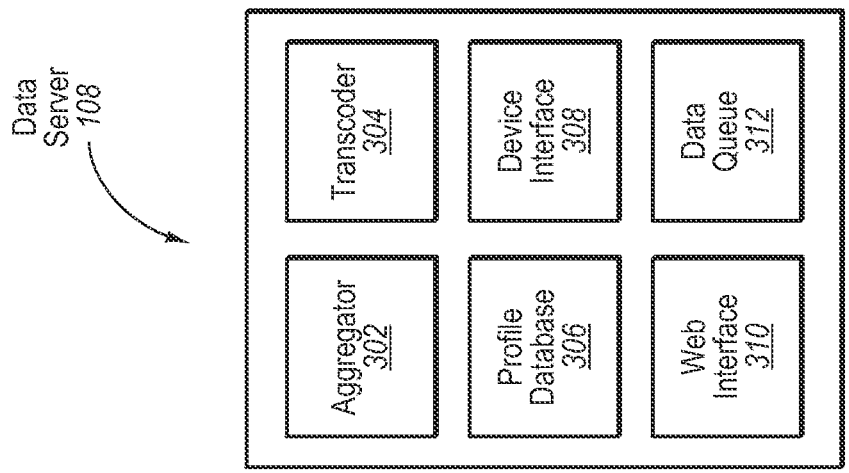
FIG. 3 depicts an exemplary embodiment of a server for selectively activating user alerts associated with the receipt of a communication.

FIG. 3 provides details concerning aspects of a data server 108. In the exemplary embodiment, the data server 108 operates in conjunction with the communication devices 102, 104, the content providers 110 and the email clients 112. The data server 108 may be any server acting as a queue for the asynchronous transmission of data to the communication device 102 and may include an aggregator 302, a transcoder 304, a profile database 306, a device interface 308, a web interface 310 and a data queue 312.

In one embodiment of the invention, the data server 108 comprises a digital media server, collecting digital media files such as podcasts, videos or songs from the Internet and transmitting them to a communication device 102. To collect such digital media, the data server 108 includes a content aggregator 302. The aggregator 302 manages a plurality of predefined web feeds published by the content providers 110 and downloads each web feed at a specified interval or in any other manner or schedule. If the data in a web feed has substantively changed from when it was previously checked—indicating the availability of new content—the aggregator 302 determines the location of the most recent content and automatically downloads it. The data server 108 can also obtain media content in other manners as well from different types of repositories or services. In addition, the data server 108 may receive specific requests from the devices 102 that are then implemented by the data server 108.

The digital media files downloaded by the aggregator 302 from the content providers 110 may be encoded in a format incompatible with the communication devices 102 used in conjunction with the invention. For example, digital media files in the common MP3 format are often too large to easily download over a typical wireless communication network. Thus it may be necessary for the transcoder 304 to transcode MP3 files into a mobile-friendly format like Adaptive Multi-Rate (AMR) mobile telephone audio format, or some other mobile-friendly format. Digital media content other than MP3 files, in formats incompatible with the communication devices 102 may similarly be transcoded to a mobile-friendly format by the transcoder 304. This enables the data server 108 to deliver the content in a manner that optimizes network usage and device capabilities. The data server 108 can also deliver the content in a form that is optimized for the device or that has been selected by the recipient. For example, a podcast can be delivered as a voice message, an MMS message, and the like.

Whether a digital media file, an MMS, SMS, EMS, email or voice message or other communication, the data server 108 receives an incoming communication from an email client 112, a content provider 110 or a sender device 104 and stores the communication in the data queue 312, until it is transmitted to a recipient device 102 via the device interface 308. The device interface 308 provides the mechanism through which the data server and the communication device communicate.

According to an embodiment of the invention, the alert profile for a recipient device 102 is stored on the device itself. In another embodiment of the invention, the alert profile of the recipient device may be stored in the profile database 306 of the data server. A recipient may modify or manage his/her alert profile in the profile database 306 using his/her device 102 through the device interface 308. Alternately, the recipient may modify or manage his/her alert profile in the profile database 306 using a website on the Internet or other IP network which is linked to the data server through the web interface 310.

When the alert profile for a communication device 102 is stored on the data server 108, the data server may deliver alert-rendering instructions to the recipient device in addition to delivering the communication. The alert-rendering instructions may specify how and when to render an alert for the communication, in which case they can be sent simultaneously or substantially simultaneously with the communication. Alternately, the alert-rendering instructions may only specify how to render an alert for the communication, in which case the server may separate delivery of the communication from delivery of the alert-rendering instructions when an alert is deactivated. Alternatively, the data server 108 may delay delivery of the communication and the alert-rendering instructions until the alert is deactivated. In any event, the server receives a communication for the recipient device 102 and stores it in the queue 312. Depending on the properties of the communication, the capabilities of the recipient device and other factors, the communication may be transcoded or otherwise processed prior to being delivered to the recipient device 102.

In one embodiment, prior to transmitting alert-rendering instructions associated with the communication to the recipient, the device interface 308 refers to the alert profile corresponding to the recipient device 102 in the profile database 306 to determine whether an alert is activated or deactivated. If the alert is deactivated, the server transmits only the communication to the recipient device, without transmitting the alert-rendering instructions associated with the communication to the recipient device. Alternatively, the data server can delay delivery of the communication and of the alert-rendering instructions. If the alert is activated, the server transmits both the communication and the alert-rendering instructions to the device. When an alert is deactivated at the time the server transmits the communication to the recipient device, the device interface may be configured to periodically refer back to the alert profile and to transmit the alert-rendering instructions if and when the alert is activated.

Figure 4:
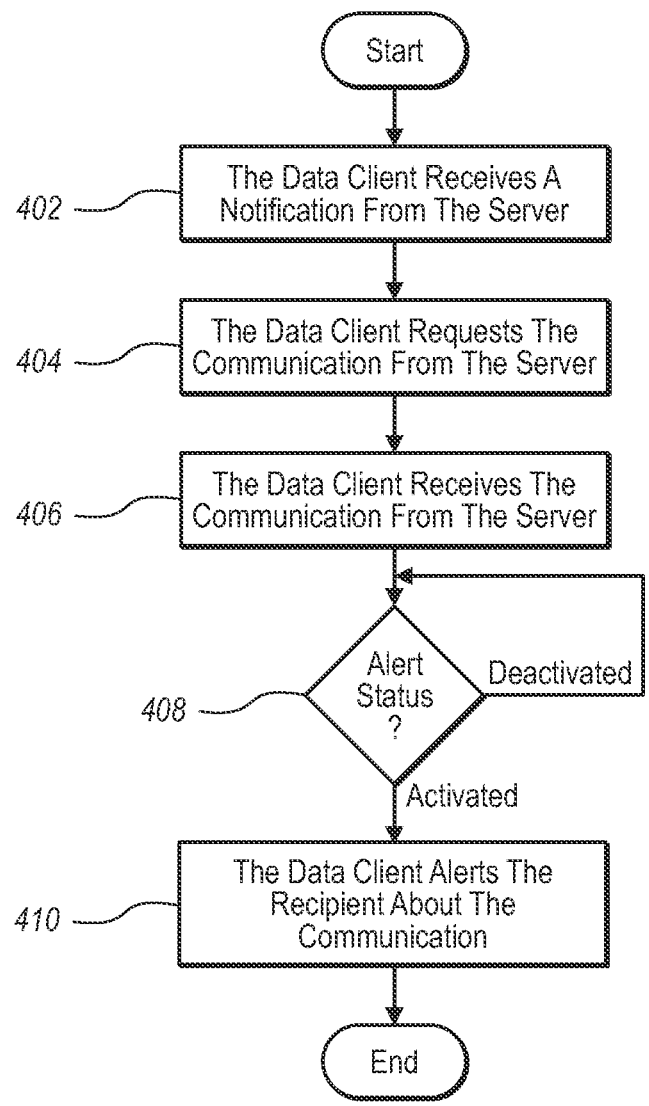
FIG. 4 illustrates a method for selectively activating user alerts associated with communications received on a recipient device.

FIG. 4 illustrates a method for selectively activating an alert when receiving a communication. The process often begins after an alert profile has been configured for the recipient device when a data client on a communication device receives 402 a notification from a server that a message or other communication is waiting for the device at the server. The data client may be configured to automatically request 404 the message or communication from the server, after which the data client receives 406 the message or communication when the server transmits it in response to the data client's request.

In this example, the data client refers to the rules in the alert profile to determine 408 whether or not to alert a device user about the receipt/availability of the message or communication. The rules of the alert profile activate and deactivate user alerts for messages or communications based on one or more criteria and may also specify the type of alert to use. Accordingly, the data client may ascertain certain information such as a priority, type, sender, content, or other aspects of the message or communication, the time of day, physical proximity of the device 102 to a particular location or to the originating device 104, and the like or any combination thereof. Once ascertained, this information can be compared to the rules in order to determine 408 whether or not to alert the device user about the receipt/availability of the message or communication. For instance, the data client may compare the priority, type, sender, or content of the message, or the time of day or the distance of the recipient from a location or from the originating device to one or more priorities, types, senders, content, time periods, or distances, respectively, specified in the rules.

If an alert is deactivated based on this determination, the data client does not alert the recipient about the received/available communication or message unless and until the alert becomes activated. If the alert is activated, the data client alerts 410 the recipient about the received communication or message using the specified alert type (or using a default alert type if one is not specified).

In another embodiment, the method 400 can begin when the communication device receives an incoming telephone call or network-based instant connect communication (e.g., push-to-talk or PTT) request. Where the communication device is a cellular device, this typically involves various communications back and forth over a control channel between the cellular device and an MTSO to establish a voice channel for receiving the incoming call. In this case, a module within the cellular device can refer to the rules in the alert profile to determine whether and how to render an alert for the incoming call.

The method of FIG. 4 may be modified and adjusted to accommodate different types of communications. In one embodiment, the communication is an SMS message. In this case, the data client may not receive a notification from the server, and therefore the data client may not request the message from the server. These two steps are bypassed and instead, the message is transmitted to the device 406 over the control layer of the network using an appropriate protocol, such as the SS7 protocol within the GSM standard or the TCP/IP protocol within the same standard. The SMS client on the device then checks 408 in the alert profile whether an alert is activated or deactivated. If the alert is activated, the SMS client alerts 410 the recipient about the receipt of the SMS message. If the alert is deactivated, the SMS client periodically checks the alert profile until the alert is activated, at which point the SMS client alerts 410 the recipient about the message.

In another embodiment the communication is an MMS message. The data client 206 receives 402 a notification from the server that an MMS message is waiting for the device at the server. The notification may be in the form of an SMS notification, an HTTP push or a WAP push. The data client may be configured to automatically request 404 the message from the server using HTTP with specialized commands and encodings, which are defined in a technical standard specified by the Open Mobile Alliance. After requesting the message or data from the server, the data client receives 406 the message from the server, which message may be transmitted by the server using HTTP. Similar to the way the SMS client handles an SMS message, the MMS client on the device refers to the alert profile to determine 408 whether a user alert is activated or deactivated. If the user alert is activated, the MMS client alerts 410 the recipient about the receipt of the MMS message. The MMS client does not alert the recipient about the receipt of the MMS message so long as the user alert remains deactivated.

Those of skill in the art will recognize that alerts for other asynchronous communications such as email messages, voice messages, digital media files and other data may be selectively activated and deactivated according to the invention with the appropriate changes being made to accommodate the type of communication involved.

Figure 5:
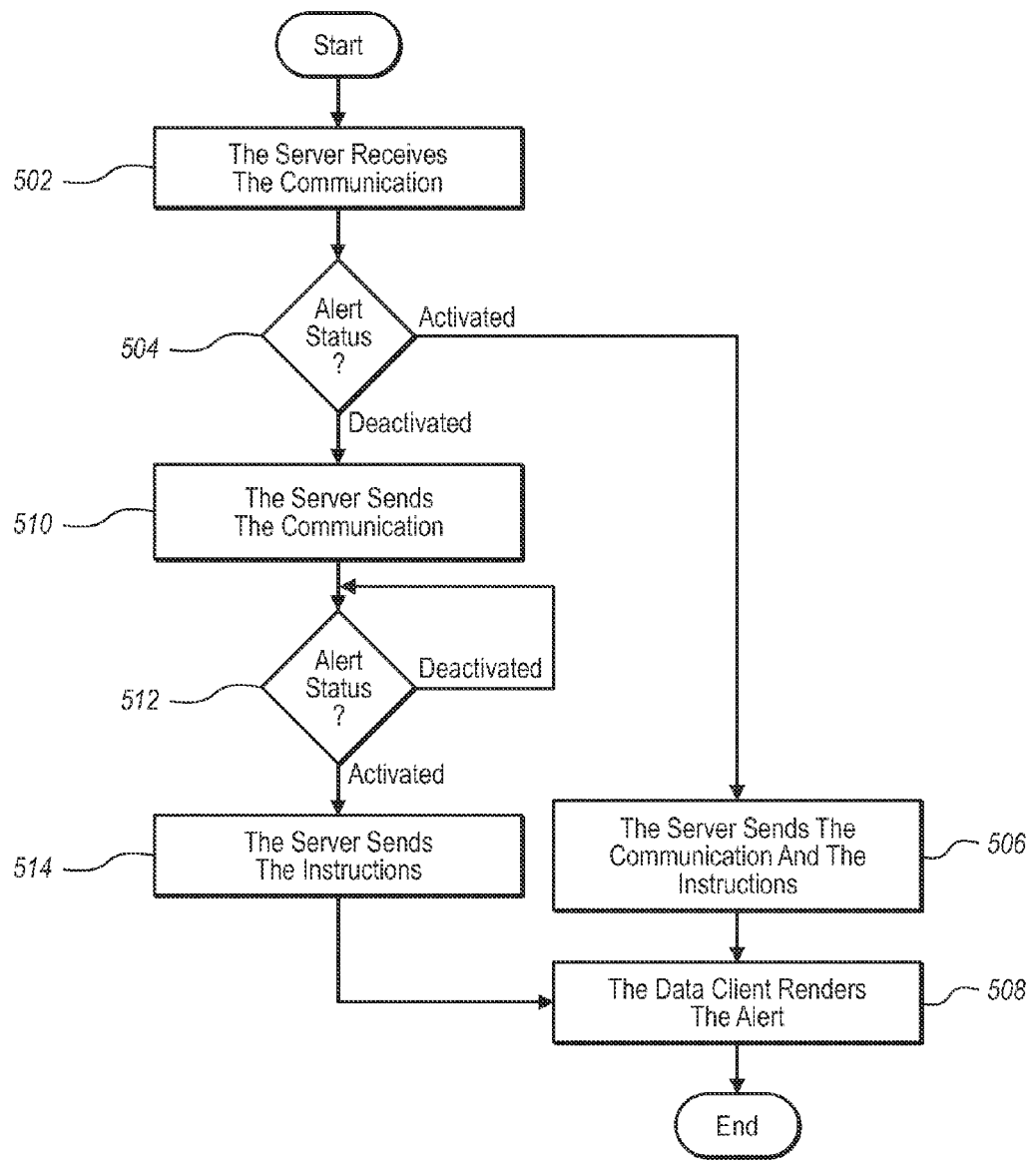
FIG. 5 depicts a method for selectively activating user alerts associated with communications transmitted from a server.

FIG. 5 depicts another method for selectively activating an alert on a communication device. In the method of FIG. 5, the data server may be configured to separate the delivery of a communication from the delivery of alert-rendering instructions associated with the communication. In this case, the alert profile for a recipient device 102 may be stored in the profile database 306 of the data server 108. However, the alert profile may also be stored in other locations accessible to the data server, such as on the recipient device 102 or on a storage device.

Accordingly, the server receives 502 a communication addressed to the recipient device 102. The communication may be an MMS, SMS, EMS, voice or email message sent from an originating communication device 104 or email client 112, or it may comprise a digital media file retrieved by the data server 108 from the content providers 110, or it may comprise any other type of asynchronous communication sent from some other originating device or location.

The server refers to the alert profile corresponding to the intended recipient device 102 to determine 504 whether an alert is activated or deactivated for the received communication. To make this determination, the server may first ascertain certain information. The information ascertained can include a priority, type, sender, or content of the communication, a distance of the recipient device 102 from a location or from the originating device 104, the time of day, and the like or any combination thereof. With regard to time-dependent alert criteria, a recipient device (or the network) can be configured to inform the data server when the device switches time zones so that all alerts are in local time of where the device is. The information ascertained by the server can than be compared to the rules to determine whether the alert is activated or deactivated for the communication.

If the server determines that the alert is activated for the communication, the server transmits 506 the communication and alert-rendering instructions to the recipient device 102. As indicated above, the alert-rendering instructions can be formulated by the server from the alert profile and can specify either how to render an alert or both how and when to render an alert. The data client on the device renders the alert as specified in the alert-rendering instructions to notify 508 the user about the receipt of the communication.

If the server determines that an alert is deactivated for the communication, the server may transmit 510 the communication to the recipient device without transmitting the alert-rendering instructions to the device. In this case, the server can periodically check 512 the alert profile to determine if and when a deactivated alert becomes activated. If the alert remains deactivated, the server can continue to periodically check the alert profile until the alert is activated. Once the alert is activated, the server transmits 514 the alert-rendering instructions to the device 102, and the data client on the device renders the user alert to notify 508 the recipient about the receipt of the communication.

In the embodiment just described, the alert-rendering instructions may only specify how to render an alert, in which case the server may not send alert-rendering instructions unless and until a corresponding alert is activated. In this case, the communication can be transmitted to the recipient device immediately upon receipt, whether or not alert-rendering instructions are also transmitted to the device at the same time as already described, or at a later time when a corresponding alert is activated and alert-rendering instructions are sent to the device.

In another embodiment, the alert-rendering instructions may specify both how to render an alert and when to render it. In this case, the alert-rendering instructions can be sent with the communication whether or not the alert is presently activated and the device can render the alert immediately if the alert is presently activated, or later if the alert is not presently activated but becomes activated later per the instructions. For instance, if a message is received and a corresponding alert is deactivated due to the failure of one or more criteria (e.g., a message is received during do-not-disturb hours), the alert-rendering instructions can instruct the recipient device to render the alert upon satisfaction of the one or more criteria (e.g., after the do-not-disturb hours are over).

While discussed in the context of the data server 108 of FIG. 1, the method 500 of FIG. 1 may also be performed by a mobile telephone switching office ("MTSO") or other network element within a cellular network having access to the recipient's alert profile. In this embodiment, the MTSO or network element receives 502 an incoming telephone call or network-based instant connect communication request intended for the recipient device 102 and refers to the recipient alert profile to determine whether an alert is activated or deactivated for the incoming call. If the alert is activated, the MTSO attempts to establish the call with the recipient device, and if successful, the recipient device renders the alert. If the alert is deactivated, the MTSO may connect the incoming call with a voice message server so the originator of the incoming call can leave a voice message for the recipient.

Those of skill in the art will recognize that the method of FIG. 5 is only illustrative of one specific embodiment. Some elements of the method may be performed either before or after other elements while still falling within the scope of the claims. For instance, FIG. 5 illustrates a server receiving 502 a communication, determining 504 whether an alert is activated or deactivated and sending 506 the communication and alert-rendering instructions to the recipient device if the alert is activated, while sending only the communication if the alert is deactivated. However, the server may also receive 502 a communication and transmit it to the recipient without first determining whether an alert is activated or deactivated. The server may then determine whether the alert is activated or deactivated after transmitting the communication and send alert-rendering instructions to the recipient if the alert is activated. Even though the server does not send the alert-rendering instructions to the recipient device at the same time the server sends the communication, the alert-rendering instructions and the communication are sent substantially simultaneously and so the corresponding alert may be rendered by the recipient device substantially simultaneously with the receipt of the communication.

Embodiments of the present invention may be implemented in connection with a special purpose or general purpose telecommunications device, including wireless telephones and other telephony-enabled mobile devices, landline telephones, or special purpose or general purpose computers that are adapted to have telecommunications or data networking capabilities such as cable set top boxes or PCs. Embodiments within the scope of the present invention also include computer-readable media for carrying or having computer-executable instructions or electronic content structures stored thereon, and these terms are defined to extend to any such media or instructions that are used with telecommunications devices.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer readable storage devices storing computer executable instructions which, when executed by a processor in a server or other network component facilitating communication between an originating device and a recipient device, a method for alerting a recipient about the receipt and/or availability of a communication by the recipient device, the method comprising:

receiving a communication from an originating device that is intended for a recipient device;

accessing an alert profile for the received communication, wherein the alert profile includes rules that are available for determining whether an alert for the communication is to be activated or deactivated, the determination dependent on at least one user-defined criterion identified in the rules, the at least one user-defined criterion relating to one or more of:

proximity of the recipient device to the originating device;

a priority of the communication;

a sender of the communication; and content of the communication;

generating alert instructions for rending the alert based on the rules;

transmitting the communication to the recipient device;

transmitting the alert instructions for rendering the alert to the recipient substantially simultaneously in association with the transmission of the communication to the recipient device if the alert is activated when the communication is transmitted;

transmitting the alert instructions for rendering the alert to the recipient substantially after the transmission of the communication to the recipient device as a separate communication if the alert is deactivated when the communication is transmitted; and wherein the alert instructions enable the recipient device to render the alert if the alert is activated and not render the alert if the alert is deactivated.

2. The computer program product of claim 1, wherein the determination of whether an alert is activated or deactivated is additionally dependent on a type of the communication.

3. The computer program product of claim 1, wherein the alert profile is stored on one or more of: a server that receives and transmits the communication to the recipient device, the recipient device, and a location accessible to the server.

4. The computer program product of claim 3, wherein the server includes one or more of: a multimedia message service center, a short message service center, an enhanced message service center, an email server, a voice message server and a digital media server.

5. The computer program product of claim 1, wherein the determination of whether an alert is activated or deactivated is made by the server, the recipient device, or both.

6. The computer program product of claim 1, wherein if the alert is activated, the rules specify rendition of the alert as one or more of: an audible alert, a tactile alert and a visible alert.

7. The computer program product of claim 1, wherein the at least one user-defined criterion, on which the determination whether the alert for the communication is activated or deactivated is dependent, relates to proximity of the recipient device to the originating device.

8. The computer program product of claim 1, wherein the at least one user-defined criterion, on which the determination whether the alert for the communication is activated or deactivated is dependent, relates to a priority of the communication.

9. The computer program product of claim 1, wherein the at least one user-defined criterion, on which the determination whether the alert for the communication is activated or deactivated is dependent, relates to a sender of the communication.

10. The computer program product of claim 1, wherein the at least one user-defined criterion, on which the determination whether the alert for the communication is activated or deactivated is dependent, relates to content of the communication.

11. A system comprising one or more processors and one or more physical computer readable storage devices storing computer executable instructions which, when executed within a server or other network component facilitating communication between an originating device and a recipient device, perform a method for alerting a recipient about the receipt and/or availability of a communication by the recipient device, the method comprising:

receiving a communication from an originating device that is intended for a recipient device;

accessing an alert profile for the received communication, wherein the alert profile includes rules that are available for determining whether an alert for the communication is to be activated or deactivated, the determination dependent on at least one user-defined criterion identified in the rules, the at least one user-defined criterion relating to one or more of:

proximity of the recipient device to the originating device;
a priority of the communication;
a sender of the communication; and
content of the communication;

generating alert instructions for rending the alert based on the rules;

transmitting the communication to the recipient device;

transmitting the alert instructions for rendering the alert to the recipient substantially simultaneously in association with the transmission of the communication to the recipient device if the alert is activated when the communication is transmitted;

transmitting the alert instructions for rendering the alert to the recipient substantially after the transmission of the communication to the recipient device as a separate communication if the alert is deactivated when the communication is transmitted; and wherein the alert instructions enable the recipient device to render the alert if the alert is activated and not render the alert if the alert is deactivated.

12. The system of claim 11, wherein the determination of whether an alert is activated or deactivated is additionally dependent on a type of the communication.

13. The system of claim 11, wherein the alert profile is stored on one or more of: a server that receives and transmits the communication to the recipient device, the recipient device, and a location accessible to the server.

14. The system of claim 13, wherein the server includes one or more of: a multimedia message service center, a short message service center, an enhanced message service center, an email server, a voice message server and a digital media server.

15. The system of claim 11, wherein the determination of whether an alert is activated or deactivated is made by the server, the recipient device, or both.

16. The system of claim 11, wherein if the alert is activated, the rules specify rendition of the alert as one or more of: an audible alert, a tactile alert and a visible alert.

17. The system of claim 11, wherein the at least one user-defined criterion, on which the determination whether the alert for the communication is activated or deactivated is dependent, relates to proximity of the recipient device to the originating device.

18. The system of claim 11, wherein the at least one user-defined criterion, on which the determination whether the alert for the communication is activated or deactivated is dependent, relates to a priority of the communication.

19. The system of claim 11, wherein the at least one user-defined criterion, on which the determination whether the alert for the communication is activated or deactivated is dependent, relates to a sender of the communication.

20. The system of claim 11, wherein the at least one user-defined criterion, on which the determination whether the alert for the communication is activated or deactivated is dependent, relates to content of the communication.

* * * * *